United States Patent [19]
Ackermann et al.

[11] Patent Number: 6,106,299
[45] Date of Patent: Aug. 22, 2000

[54] SYSTEMS AND METHODS FOR CONSTRUCTIVE-DIALOGIC LEARNING

[75] Inventors: Edith Ackermann; Carol Strohecker; Aseem Agarwala, all of Cambridge, Mass.

[73] Assignee: Mitsubishi Electric Information Technology Center America, Inc. (ITA), Cambridge, Mass.

[21] Appl. No.: 08/997,249

[22] Filed: Dec. 23, 1997

[51] Int. Cl.[7] .......................... G09B 11/00; G09B 19/00
[52] U.S. Cl. ................. 434/81; 434/96; 434/118
[58] Field of Search .................. 434/72, 74–76, 434/79–81, 84, 85, 93, 96–100, 118, 236, 307 R, 333; 345/326, 339, 418, 433, 953, 964; 463/1–47

[56] References Cited

U.S. PATENT DOCUMENTS

| | | | |
|---|---|---|---|
| 5,500,926 | 3/1996 | Matsuo et al. | 345/433 |
| 5,815,154 | 9/1998 | Hirschtick et al. | 345/356 |
| 5,835,085 | 11/1998 | Eick et al. | 345/326 |
| 5,874,956 | 2/1999 | LaHood | 345/339 |
| 5,874,957 | 2/1999 | Cline et al. | 345/339 |

*Primary Examiner*—Kien T. Nguyen
*Assistant Examiner*—John Edmund Rovnak
*Attorney, Agent, or Firm*—Dirk Brinkman

[57] ABSTRACT

The present invention relates to a new and useful learning system. A computer-based system permits a user to create and manipulate basic elements within an environment. The system then represents relationships within the environment. The system and user cooperate to provide a learning opportunity for the user. As the user makes or reviews changes of basic elements, he or she can learn how different aspects of an element affect the overall interactions. Two specific embodiments are disclosed. In a first embodiment, the system is used for exploring geometric patterns. The basic elements are tiles which are formed and manipulated through operations of geometric symmetry. The tiles can be combined into different repeating patterns. Multiple tiles can be used within a pattern. Also, new tiles can be created from portions of the pattern. Thus through simple interactions using basic operations and simple parts, complex effects emerge. In a second embodiment, the system is used for exploring a sociodynamic system. The basic elements are creatures with sets of defined behaviors. The system determines interactions between creatures or groups of creatures based upon a complete set of behaviors within the group. The user and the system can manipulate the behaviors, creatures, and interactions. Again, through simple interactions using basic opertions and simple parts, complex effects emerge. Finally, a user interface is disclosed which can be used with the system of the present invention. The interface includes display areas for creation of basic elements, interactions between basic elements, and selectable elements or components of elements. The interface also includes a set of selectable functions for operating on specific basic elements or upon the interactions within the environment.

8 Claims, 10 Drawing Sheets

SYSTEMS AND METHODS FOR CONSTRUCTIVE-DIALOGIC LEARNING

FIELD OF THE INVENTION

The present invention relates to computerized systems and methods for exploration of and learning about effects that emerge from interrelations between basic elements of complex systems. More particularly, the invention relates to systems and methods which generate representations of interactions between elements created, selected, and transformed by a user for purposes of learning.

BACKGROUND OF THE INVENTION

Computers have provided opportunities for significant advances in educational processes. They have been increasingly used in teaching, particularly for young children who have become extremely adept at using computers. Much educational software is based upon a teacher or tutor model, in which the system guides the user in specific areas with predefined objectives and information to be learned. Such systems interpret different levels of achievement and assume that if the information given is below the user's level, the user may become bored; if the information is above the user's level, the user may become frustrated. Also, under a strict teaching approach, the user has no control over what is being learned. Points of interest to a specific user may be missed. Often instructional software, while presenting important information, is not particularly enjoyable to use; nor is the user's resulting understanding particularly memorable. Therefore, a need exists for learning environments that permit a user to learn material at his or her own pace, exploring to depths of interest, and which are entertaining.

Complex, dynamic systems can be difficult to understand. Such systems do not operate according to a single set of rules that can be easily learned. Instead, they operate as dynamic networks of interdependent elements, which vary in unique ways based upon a large variety of factors present at a given point in time. The world is made up of great numbers of such systems, in both biological and physical domains. Examples of such systems are population growth, weather patterns, economic fluctuations, biological evolution, organizational behavior, and traffic patterns. Since it is difficult to describe such complex systems, not many tools are available for exploring and learning about them. Therefore, a need exists for a system which provides opportunities for learning about and understanding how these complex processes operate.

Mathematics, particularly the mathematics of geometry and spatial relationships, provides opportunities for studying complex systems in ways that can be made simple, enjoyable, and understandable. One way for people, particularly children, to develop mathematical and spatial skills is by working with patterns. Thus, educators and parents encourage children to play with toys that use and manipulate patterns, such as tilings, kaleidoscopes, moiré patterns, quilts, mosaics, tangrams, and geometric puzzles. The use of such playthings permits a child to learn by increasing his or her spatial skills while engaged in entertaining activities. However, many existing toys minimize control by the user, limit constructive capabilities that are useful for learning, do not allow for lengthy, rigorous explorations, and cannot capture the dynamic aspects of complex systems.

SUMMARY OF THE INVENTION

The deficiencies of prior educational tools are substantially overcome by the computer-based systems and methods of present invention, which represent interrelated dynamics of complex systems. The system uses the advantage of the memory and computational capacity of computers to allow a user to learn about complex systems through constructive exploration and play. The invention may be implemented as a playful learning environment in which children experiment with dynamic systems by constructing and transforming virtual objects through dialogic interaction with a computational device. The user creates or selects basic elements of the system having defined characteristics. In an embodiment involving geometric patterns, the user selects a simple design. In an embodiment involving sociodynamic systems, the user composes physical or behavioral patterns. The system then operates on the basic elements, simulating and making visible the emergent effects of a complex system.

According to one aspect of the invention, the user can manipulate different aspects of the system, including changes in the basic elements or interactions. The user can also create new basic elements from the interactions within the complex environment. Alternatively, the system may impose operations programmatically to illustrate alternate dynamic qualities of the complex system.

According to another aspect of the invention, a method for constructive-dialogic learning with a computational system is provided. The computational system provides elements for constructing objects. The system also provides a user mode having user functions for application to the elements and a system mode having system functions for application to the elements. In response to user selection of one of the elements and the user mode, a user function is applied to the selected element under user control. In response to user selection of one of the elements and the system mode, a system function is applied to the selected element under system control. Thus, operation of the system involves a dialogic combination of user control and system control. The user constructs an object from the elements utilizing the user functions and the system functions through user-controlled, constructive, dialogic interaction with the system.

DETAILED DESCRIPTION

Figure 1:
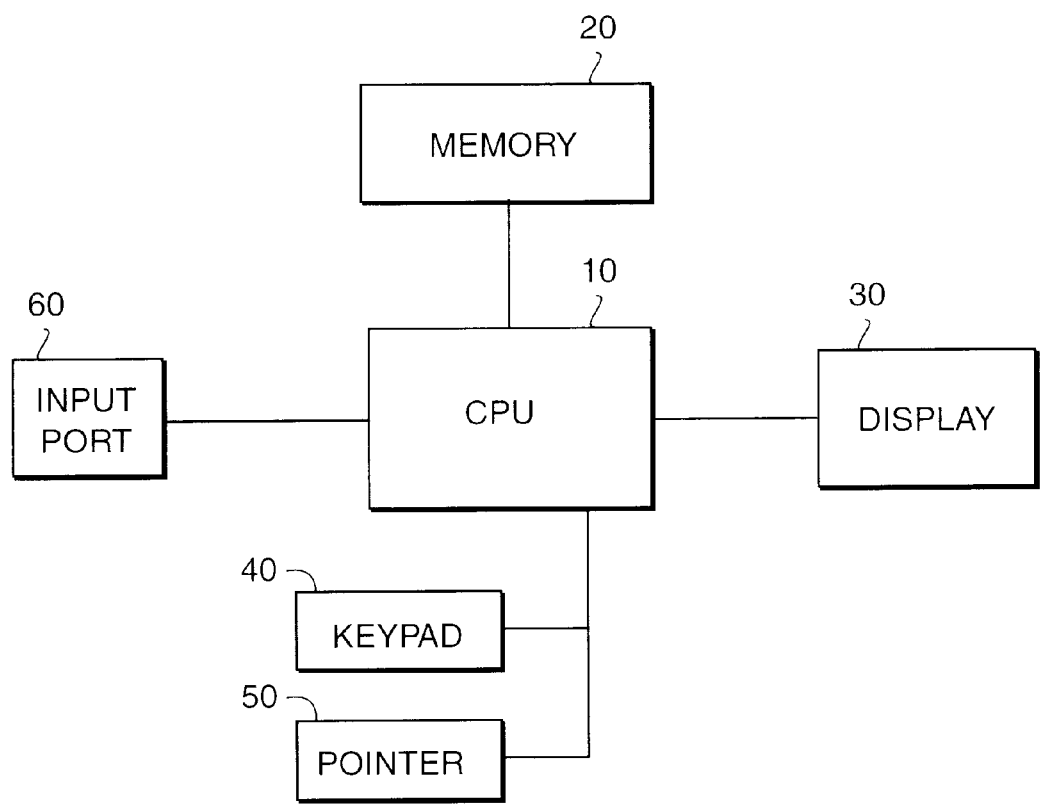
FIG. 1 illustrates hardware for implementing an embodiment of the present invention.

FIG. 1 is a block diagram of an example of a computational system used in implementing the present invention. A central processing unit (CPU) 10 is connected to a memory 20 storing instructions to be executed on the CPU 10. The memory 20 can be any type of memory, including RAM, ROM, CD-ROM, magnetic disk, hard disk, etc. Data generated by the CPU 10 during execution of the instructions is also stored in the memory 20. Alternatively, different memories can be used for the instructions and the data. The CPU 10 is also connected to a display 30 for displaying information to a user. The user can input information through a keypad 40 and pointer device 50. Of course, other types of input devices can be used, such as an ordinary keyboard, a mouse, or a touch sensitive screen. An input/output (I/O) port 60 is also connected to the CPU 10. I/O port 60 can be used to input instructions or data to be stored in the memory 20. Alternatively, instructions or data can be retrieved as needed from devices attached to the input port 60. Thus, since the present invention is designed for interactive learning, different learning modules can be used with the device. The learning modules can include instructions and data stored in a memory which are specific to the type of learning desired. The user connects the learning module to input port 60 to perform the desired types of activities.

Figure 2A:
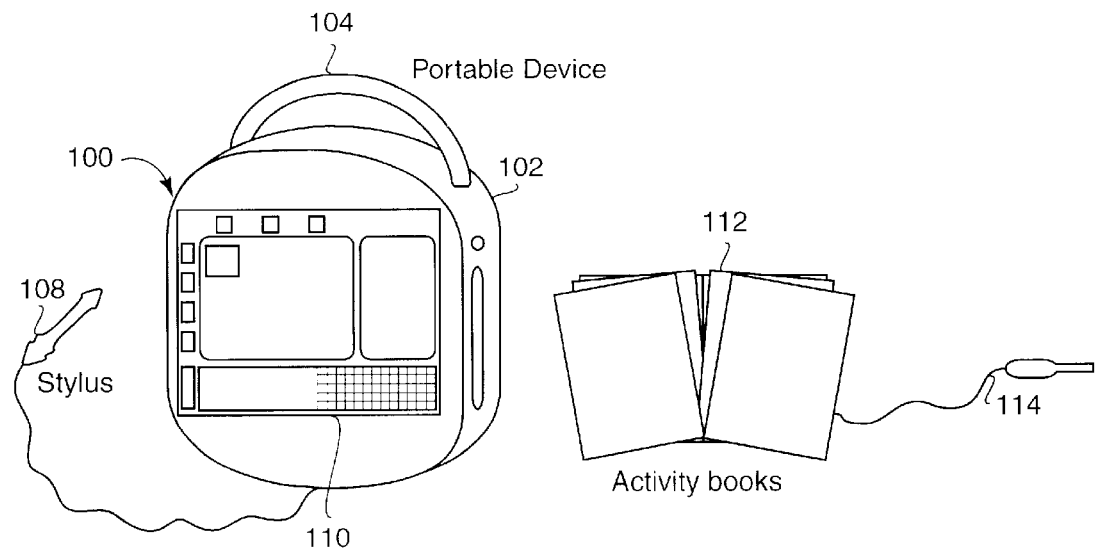
FIGS. 2A and 2B illustrate physical embodiments of the present invention.

The invention may be supported by a specifically designed, self-contained device that a child can carry and which presents its functionality playfully and colorfully. This device may have an attached stylus for inputs from the child and may be augmented by complementary materials in other media (e.g., books, kaleidoscope, etc.) A portable computational device 100 suitable for implementing the present invention is shown in FIG. 2A. The portable device 100 includes a housing 102 and a carrying handle 104. The size and weight of portable device 100 permit the device to be carried by a child. The housing 102 encloses a CPU, memory and display as shown in FIG. 1 and described above. A stylus 108 connected to the CPU within housing 102 may be used with a touch-sensitive display screen. Alternatively, a pointing device, such as a mouse or a trackball, may be utilized. A display screen 110 functions as a user interface for displaying system operations. The portable device may include an I/O port as shown in FIG. 1 for connection to an external device such as an activity book 112. The activity book may include a touch-sensitive screen, a memory and/or other electronic components. The activity book 112 may be connected to portable device 100 by a cable 114. The activity book 112 may, for example, be used by a child or may provide inputs to portable device 100 for defining elements and functions in accordance with the invention. Any suitable external device may be connected to portable device 100 through the I/O port. Such devices may include electronically adapted versions of books, kaleidoscopes, dolls, and the like.

Figure 2B:
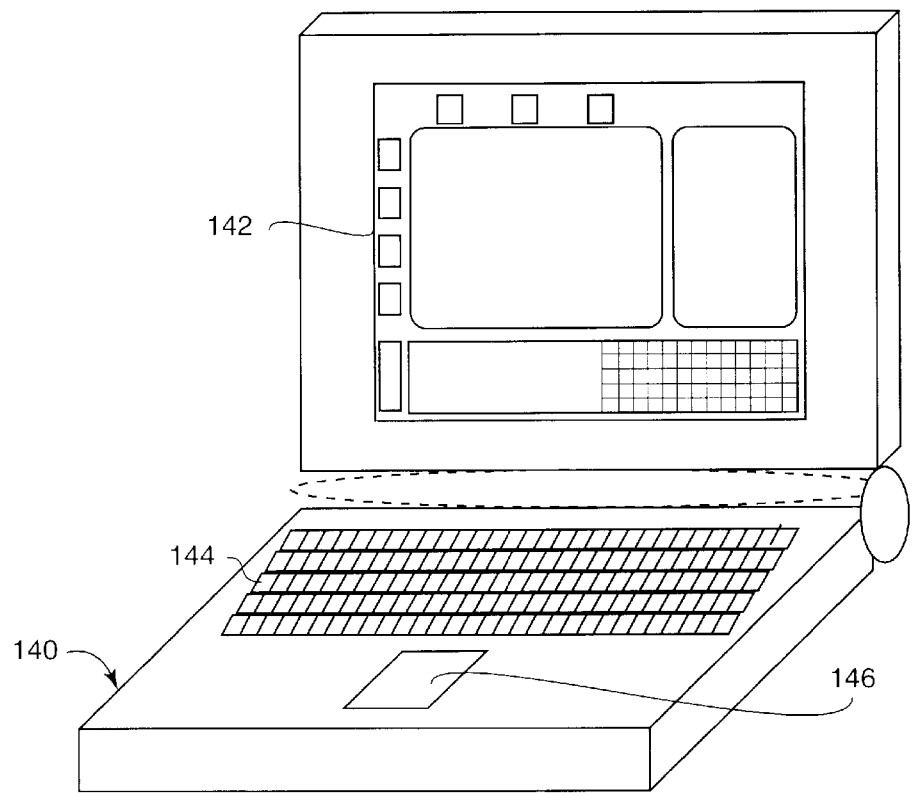

In another embodiment, the invention may be supported by a more traditional implementation on a standard laptop computer, making use of its associated pointing device (mouse, trackball, thumbpad, or etc.). As illustrated in FIG. 2B, a portable computer 140 can be used for implementing the invention. The portable computer 140 includes a CPU, memory and a display 142. A keyboard 144, trackball 146, mouse or other input mechanism can be used to input information from a user. FIG. 2B illustrates a portable general purpose computer. While portability provides additional advantages in ease of use, any type of computer could be used in implementing the invention.

The present invention relates to a system which is used for interactive learning of complex systems. In this system, a user creates objects from basic structural elements according to a selected mode of work by applying various functions and operations to the basic structural elements. Ultimately, a representation results in which the user can perceive effects of interactions between the elements. The system displays the dynamic representation of these interactions. Through a combination of system and user modifications to the basic structural elements and to the resulting interactions, the operation of a complex system can be explored by the user. The invention can be applied to any complex system which includes interactions of basic constituents.

The invention is preferably implemented as a playful learning environment in which children and adults experiment with dynamic systems by constructing and transforming virtual objects through dialogic interaction with a computational device, which may be portable. The environment supports learning through playful exploration. In contrast to the instructional characteristics of most software for learning, the environment fosters a constructive-dialogic style of interaction. The model of the invention is one of experimentation, distributed control, and conversational exchange rather than sequential curriculum and unilateral control. The child shares control with the system through dialog rather than conquest—a dialog that the child initiates. Although the system does not impose a prescriptive sequence of activities or topics, it responds to the child's interventions with specific, consistent, context-sensitive functionality.

The mode of work is as important as the topics in this development. Children construct objects, patterns and system states, and then negotiate changes in them. In this way they see how changing one factor influences the entire system. By constructing and transforming objects, children may learn about the domains of social dynamics, geometric symmetry and other complex phenomena. Equally important, children develop intuitions about the common underlying theme of dynamic systems. They also develop an ecological perspective on scientific practice, through sharing control and observing the balance of influences. The system does not impose a prescriptive sequence of activities or topics. Instead, it allows the user to initiate a dialog and responds by generating the unpredictable emerging effects and providing suggestions for further experimentation. Thus the constructive-dialogic nature of the environment provides a unique contribution to existing educational software and educational entertainment.

Figure 3:
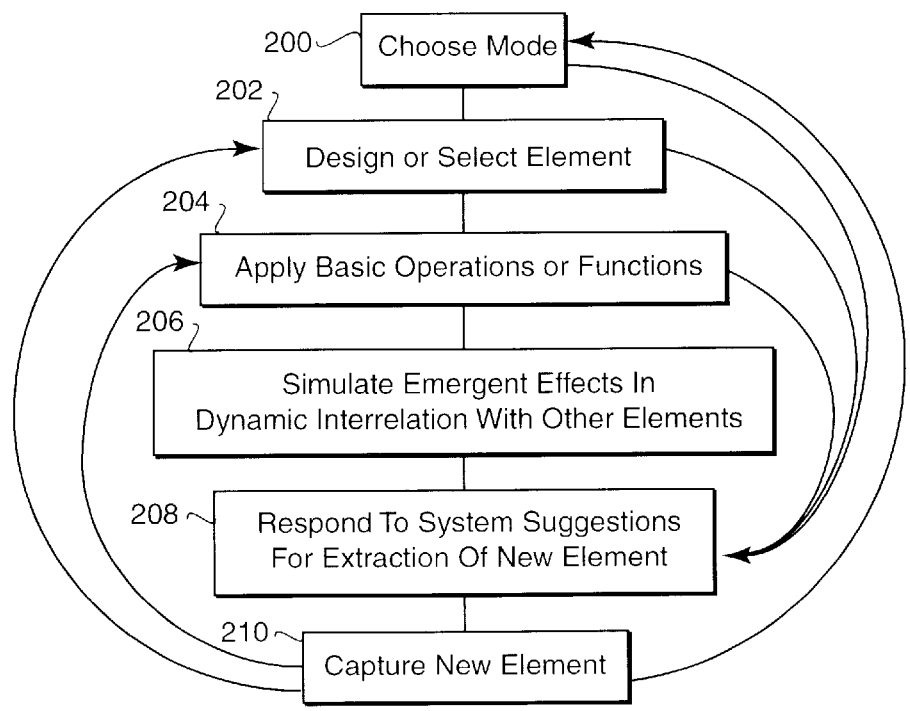
FIG. 3 is a flow diagram of operation of the present invention.
Figure 4A:
FIGS. 4A–4D illustrate different types of basic elements in a first embodiment of the present invention.
Figure 4B:
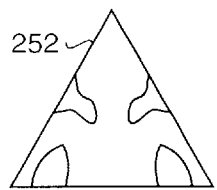
Figure 4C:
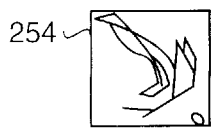
Figure 4D:
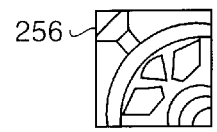
Figure 10:
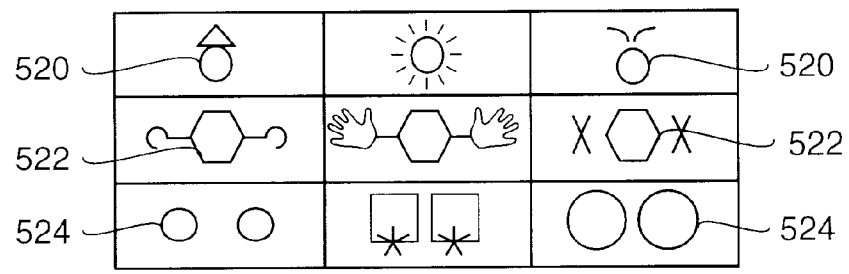
FIG. 10 illustrates basic elements in a second embodiment of the present invention.
Figure 11:
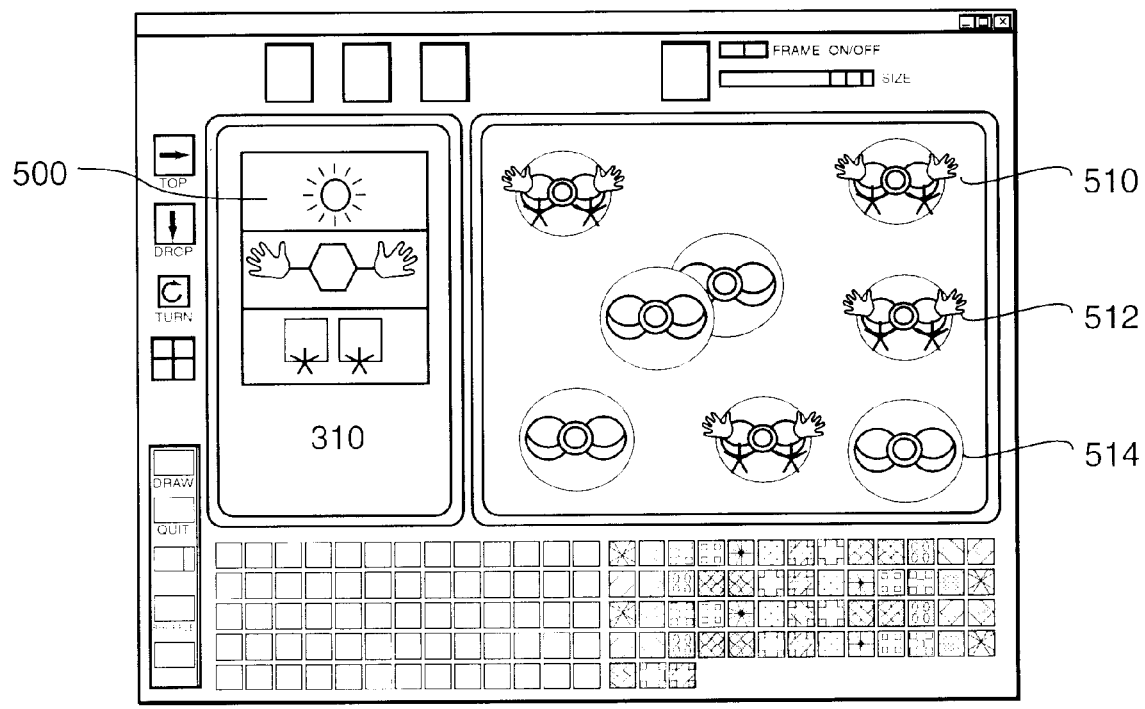
FIG. 11 illustrates compound elements and interactions of elements in the context of functionality of the second embodiment.
Figure 12:
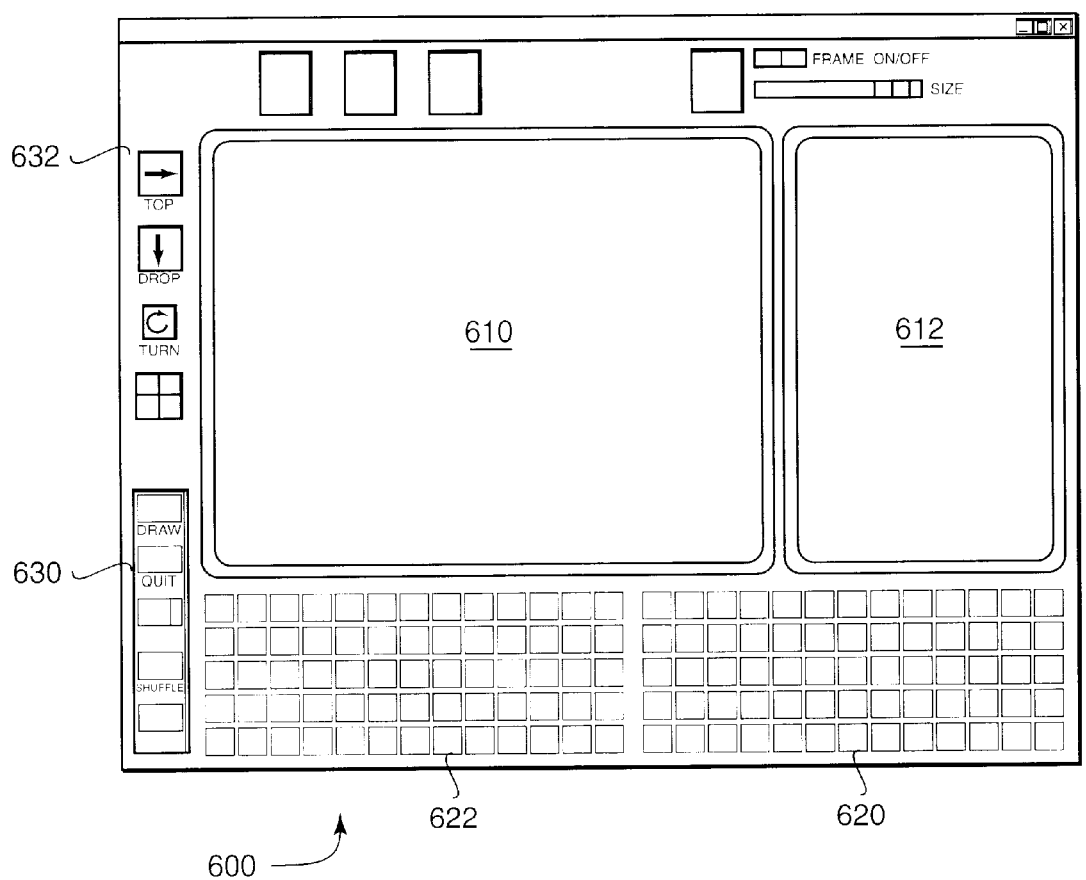
FIG. 12 shows a general display format for visual and functional embodiment of user interactions within applications for exploring interrelated dynamics of complex systems.

FIG. 3 represents the operation of the invention as it applies to complex systems generally. FIGS. 4A–9 illustrate a first specific embodiment of the present invention for exploration of geometric and dynamic properties of colored patterns. FIGS. 10–11 illustrate a second specific embodiment of the present invention for exploration of properties of sociodynamic systems. FIG. 12 represents a general format for visual and functional embodiment. The basic operation of the system is first discussed.

The basic operation of the present invention in interactive learning about complex systems is illustrated in FIG. 3. At step 200, the user selects a mode in which to design a simple or compound element. The element provides the basis for later transformations and modifications. The learning comes from visualizing changes to this element and patterns that result from its interactions with other elements. In step 202, an element may be designed or may be selected from a library of elements. In one embodiment, described below, the user selects a patterned tile from a library of patterned tiles. In step 204, the designed or selected element may be modified by applying basic operations or functions of the system. In the example of patterned tiles, operations such as translate, rotate, zoom, move and replicate may be applied to the basic element. The pointer device is used to select functions and to select and manipulate elements. In step 206, the system may simulate emergent effects in dynamic interrelation with other elements. A variety of functions may be performed by the system, either automatically or interactively with the user. In the embodiment of patterned tiles, the system may replicate the selected element to form a new pattern. In step 208, the user may respond to system suggestions for new elements. In the embodiment of patterned tiles, the system may provide visualized suggestions for new patterns and new tiles. In step 210, the new element may be captured by the user and placed in a library. The user may then proceed to one of steps 200, 202 or 204 to continue operation. It is noted that the user may proceed directly from one of steps 200, 202 and 204 to step 208 to obtain system suggestions for new elements.

In general, the system is under control of the user. However, the user may select system functions which are under preprogrammed control of the system. Thus, the user constructs objects through dialogic interaction with the system. The system may be considered as having a user mode in which the user is under full control of the selection of elements and the selection of functions to be applied to the elements, and a system mode which is selected by the user but which operates in a preprogrammed fashion after selection. The system mode may operate automatically or interactively with the user.

A first embodiment of the invention is described with reference to FIGS. 4A–9. In this embodiment, the system provides a library of tiles having decorative geometric patterns for selection by the user and for application of user functions and system functions. Examples of basic tiles 250, 252, 254 and 256 are shown in FIGS. 4A–4D, respectively. Such basic tiles may be modified as described below.

Different functions and operations can be used, such as translate, mirror, rotate, zoom, move, and variably select. The pointer device 50 (FIG. 1) can be used to select and manipulate tiles. A cursor on the display 30 represents the location of the pointer device for selection and manipulation of a tile. Tiles may be combined to form new elements.

Once a compound element has been created, it may then be sized and multiply replicated to form a pattern. In order to explore the effects of pattern changes, different extractions of new elements are possible. A selected portion of the pattern can be captured for further exploration, as the user returns to mode choice, design or selection, and/or application of functions and operations.

The first embodiment also includes an automated process. These transformations are inspired by kaleidoscopes. Multiple changes can be made to all units sequentially or simultaneously. Thus, the patterns can have a changing effect based upon the transformational mode.

Figure 5:
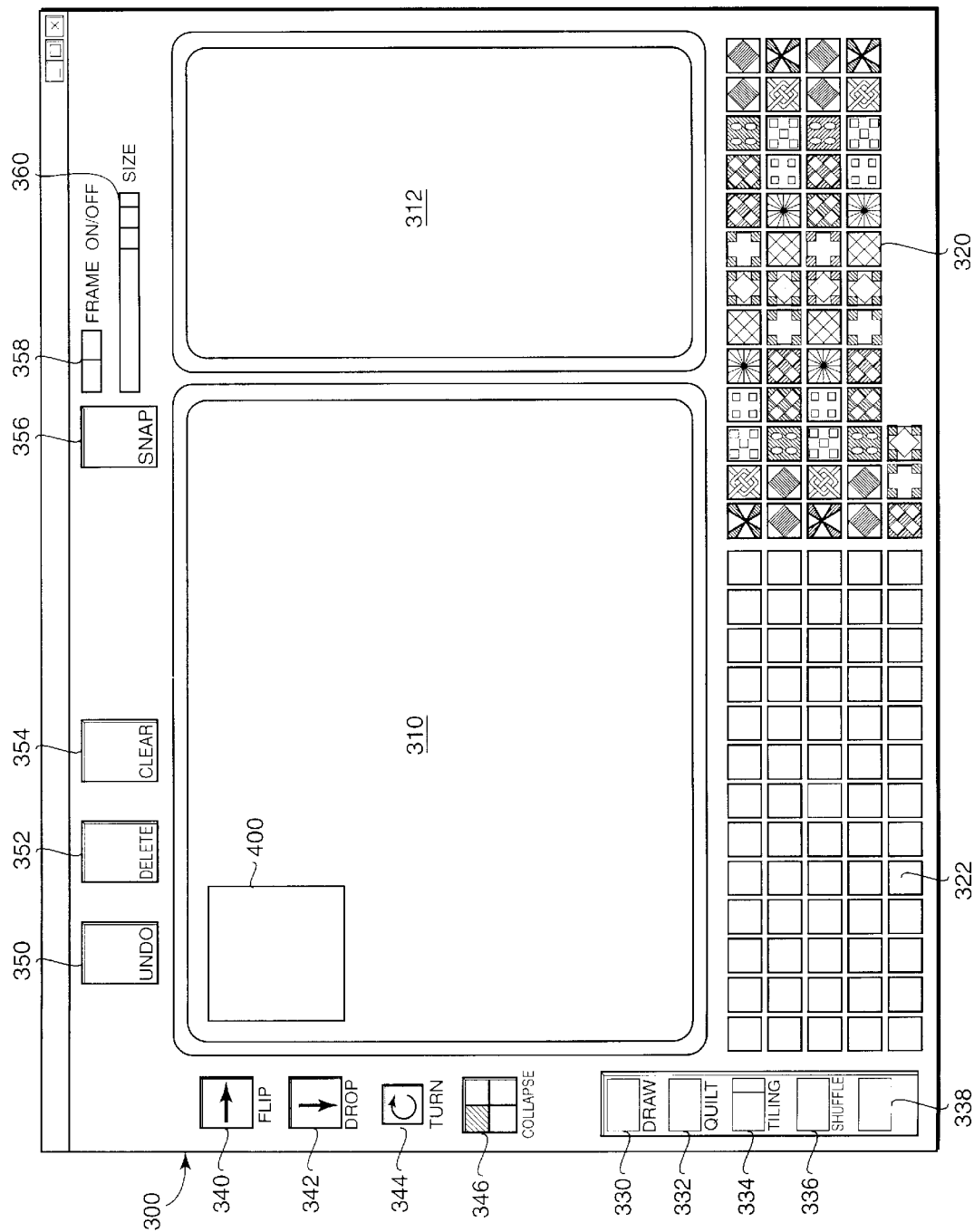
FIG. 5 illustrates basic elements in the context of functionality of the first embodiment.
Figure 6:
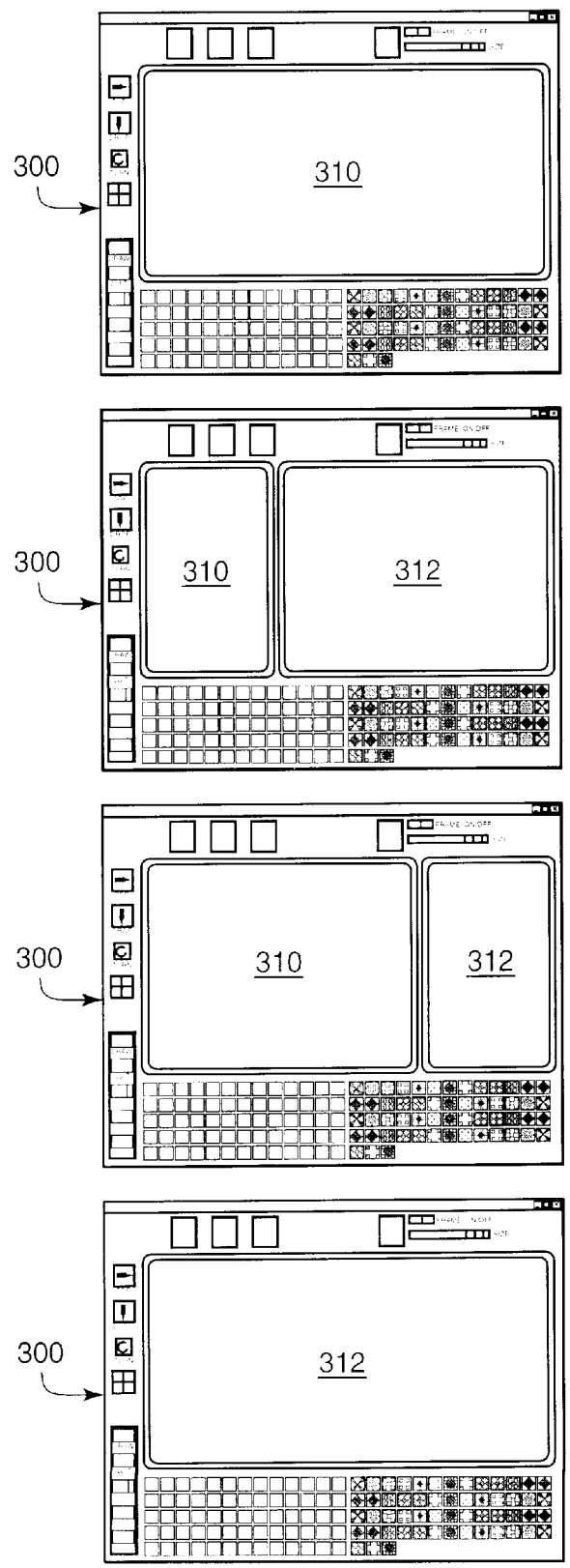
FIGS. 6A–6D illustrate visualization of the constructive-dialogic style of interaction as it is displayed within the first and second embodiments.
Figure 7:
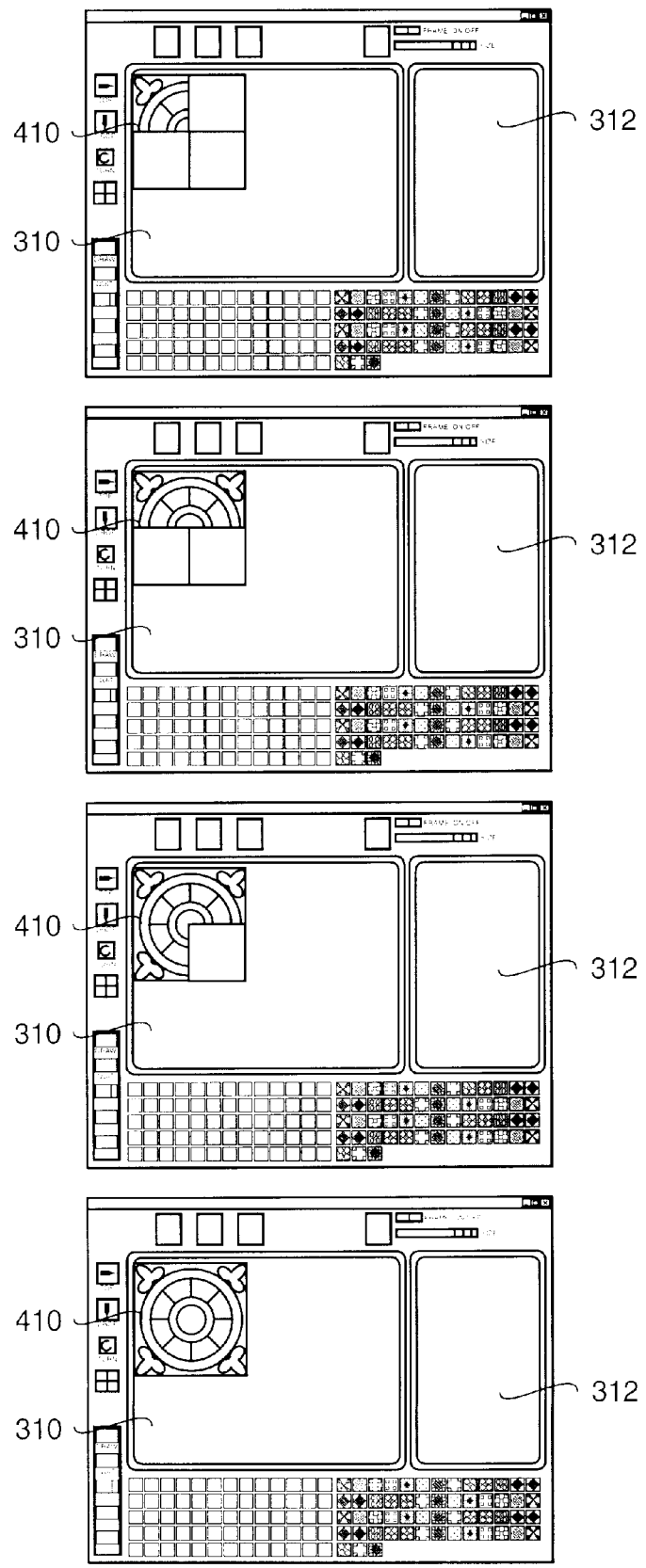
FIGS. 7A–7D illustrate creation of compound elements from basic elements according to the first embodiment.
Figure 8:
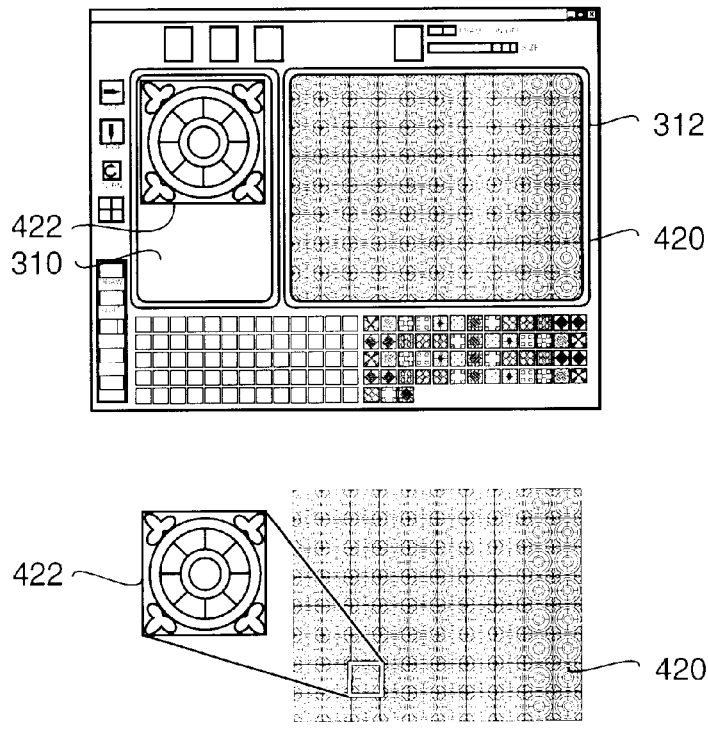
FIGS. 8A and 8B illustrate creation of patterns and emergent effects within the first embodiment.
Figure 9:
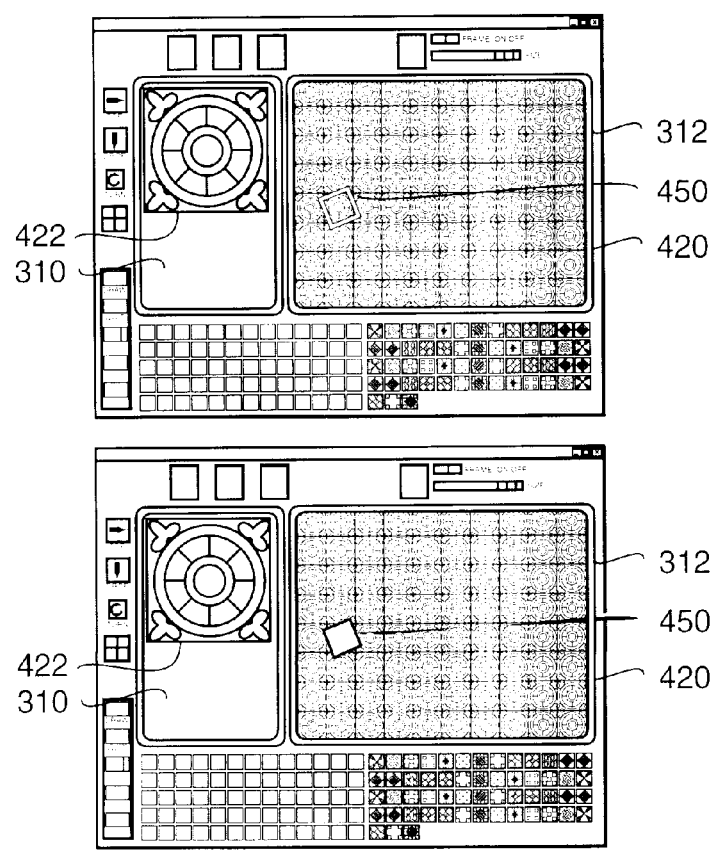
FIGS. 9A and 9B illustrate a suggestion from the first embodiment of a new basic element, and the child's response to accept the suggestion by extracting the new element.

Working modes, functions, and operations are accessible through visual presentation of the functionalities on a display screen 300, as shown in FIG. 5. Effects of interactions are illustrated primarily through two main display areas of flexible dimension. These areas exist side-by-side and include a user working area 310 and a system working area 312. The user area 310 is for constructing playthings, and the system area 312 is for automatic transformations. The areas change width, as shown in FIGS. 6A–6D, according to whether the interventions of the user or the system are predominant at a given moment.

Display screen 300 also includes a tile library 320 containing basic tile patterns for selection by the user. The user may select one of the tiles in tile library 320 using the cursor and pointing device. Tile library 320 further includes an area 322 for storing user created tiles. The user created tiles may be selected and manipulated at a later time.

A series of working mode buttons 330, 332, 334, 336 and 338 permit the user to select an operating mode. The working modes may include DRAW button 330 in which the child designs a tile; QUILT button 332 in which the child arranges tiles into patterns by hand; TILING button 334 in which the child and the system alternate as the child builds tiles and the system spreads them into patterns and suggests selections for new tiles; SHUFFLE button 336 in which the system introduces variations in a pattern by repeatedly applying operations of geometry symmetry in predetermined sequences; and KALEID button 338 in which the system introduces variations in a pattern by applying transformations of basic tile shapes and patterns. Function buttons 340, 342, 344 and 346 may be selected in the tiling mode as described below. The specific operations in the tiling mode may include FLIP button 340 which reflects the tile around the y axis; DROP button 342 which reflects a tile around the x axis; TURN button 344 in which the tile is rotated in 90° increments; and COLLAPSE button 346 in which tiles built as quadrants stacking left to right and top to bottom can be shrunk to a single quadrant, which is then defined as a new tile.

The display screen 300 may also include general functions buttons such as UNDO 350 in which the system returns to the previous state; DELETE 352 in which an individual unit is removed; CLEAR 354 in which everything is removed from the active area (user or system); and SNAP 356 which includes a box that delineates an area to be defined as a new tile. An on-off function 358 toggles the frame off and on, and a size function 360 adjusts the size of the frame.

FIGS. 7A–7D illustrate one mode of creation of compound tiles from basic tiles according to the first embodiment. The construction occurs within the user working area 310 and builds as a four-tile grid. The user may apply functions and operations to modify and transform each of the component basic tiles.

In the tiling mode, exchanges between the user working area 310 and the system working area 312 occur most frequently, exemplifying the constructive-dialogic style of interaction of the present invention. This dialog is performed through the layouts of FIGS. 6B and 6C. The user is greeted with an invitation to construct a tile, indicated by box 400 in FIG. 5. The child drags one of the ready-made tiles from the library 320 and uses it as an element in a new construction, as shown in FIG. 7A. An outline of a four tile grid 410 is then displayed as shown in FIG. 7A. The child may then drag other tiles from the library 320 into the working area 310 as shown FIGS. 7B–7D. The system places each new tile within grid 410. Additional tiles are placed left to right and top to bottom. Each newly placed tile can be transformed by applying operations of geometric symmetry. The flip function reflects the tile around the y axis. The drop function reflects the tile around the x axis. The turn function is a 90° rotation to the right. When the grid 410 is filled, the child can click on the system area 312 to continue the dialog. The system interprets the contents of the grid 410 as a new tile. It then sizes and replicates the tile, arranging it into a pattern in the system working area 312, as in FIG. 8A.

When the system working area 312 is active, the system can complete a proposal made by the user or metaphorically offer suggestions for further interactions on the part of the user. The system may respond to the user construction of a compound element by creating a pattern 420 based on resized and reiterated copies of compound element 422, as shown in FIGS. 8A and 8B.

The system then presents an automatically moving frame box 450 that proposes delineations of a pattern for possible excerption as a new basic element, as shown in FIGS. 9A and 9B. The moving frame box 450 floats randomly around the pattern. It moves slowly and changes orientation as it goes. The child can stop the movement by clicking directly on the moving frame box 450, freezing its orientation. The frame box 450 can then be repositioned using the pointing device. The child can adjust the size of the frame box 450 or use the on-off function to turn the frame box off, making it disappear. If the child turns the frame box back on, it reappears and resumes its free-floating movement. The child can also cause the frame to resume movement without toggling the frame off and on. Alternatively, the child can double-click the frame or click in the user working area 310 and then in the system working area 312. As this area becomes activated, the frame is again set into motion. When the frame box satisfactorily delineates a new area of the pattern, the child can click on the snap button. The system interprets a new tile by grabbing the framed part of the pattern, rotating it back to 0° and saving it to the child's area 322 of the tile library. Now the child can click on the user working area 310. The screen areas adjust size accordingly, and the child can begin a new dialog. With this dialogic style of interaction, the child can create many intriguing patterns.

In addition to the tiling mode described above, the system may include manual modes which maximize the child's constructive capability. The user working area 310 is expanded to its maximum width as shown in FIG. 6A and the child's creations result solely from direct manipulation. Thus, the conversational style is more monologic and the child has maximal control. In the draw mode, the child uses a simple pallet of tools to create free-hand decorations for the tiles. Newly made tiles may be saved to the child's area 322 of the tile library. In the quilt mode, tiles dragged from the library become patches in a freeform quilt. The child can use the frame to bound new areas across patches. These unique selections may be saved as new tiles in the child's area of the tile library and are available for use in other modes.

The system also includes automatic modes which maximize the system's contribution. The system working area 312 expands to its maximum width as shown in FIG. 6D, and the system automatically generates variations of geometric patterns. The child relinquishes control temporarily but has an opportunity to contemplate the evolving transformations. In the shuffle mode, the system cycles through a series of transformations, applied repeatedly to generate a dynamic pattern. Varying sequences of the simple operations of geometric symmetry, including flip, drop and turn, create intriguing effects that inspire new creations when the child is in more constructive modes. In the kaleid mode, potentials for greater complexity are served by variations of the basic tile shapes and an expanded repertoire of geometric operations. Thus each mode has its own way of generating new tiles. As the child explores transformations and resulting patterns, examples of the results can be preserved by framing a selection within a pattern. This selection is automatically saved in the child's area 322 of the tile library and is available for use in other modes. As the child becomes more familiar with operation, switching from mode to mode to create colorful tiles and patterns augments the constructive-dialogic style of interaction.

FIGS. 10 and 11 illustrate operation of the invention according to a second embodiment for exploration of sociodynamic systems. The general operation remains as illustrated in FIG. 3 and described above. However, a basic element, rather than being a geometric pattern, is a creature part having both an aspect of a whimsical creature's behavior and a representation of the physical component. The basic creature part may be combined with others to create a tripartite creature 500 that functions as the compound element. By introducing many creatures 510, 512, 514, etc. together into the system working area 312, the child can simulate funky patterns of social interactions. The system area 312 shows many creatures in birds-eye view, and as the creatures influence one another's behaviors, complex patterns emerge. The user, in conjunction with the device, can make further transformations by extracting and changing basic and compound elements, applying operations to inhibit, augment, or reverse behaviors. The same process which applies to geometric patterns also applies to sociodynamic patterns, with comparable results.

FIGS. 10 and 11 illustrate the basic elements for the second embodiment using whimsical creatures with anthropomorphic behaviors. The user selects three creature parts, represented as head 520, belly 522 and base 524, for creating a creature. Each of the different selections for creature parts corresponds to different behaviors. The behavioral components from the different body parts also interrelate to provide an overall behavior for the creature. After creating one or more characters, the system represents an interaction between characters. The creatures 510, 512, 514, etc. interact within system working area 312, and affect one another's behaviors. The movements and interactions change as the creatures move around the field. The creatures may interact in diads, triads, or groups, which affects the types of interactions. As with the geometric embodiment, the user or system may modify different characters, which changes behavioral patterns. Such transformations can include complete changes in behavioral elements, or changes in the "strength" of a behavioral element. As changes are made, the interactions change and are represented as movements of varying speeds, directions, and patterns on the field.

The second embodiment utilizes the constructive-dialogic style of interaction as well as the general functions described above in connection with the first embodiment. General functions may include undo, delete, clear, and snap. The library includes ready-made creatures and an area having empty slots for the child's creations. Modes of operation may include draw, stage, create, shuffle and enact. The child can duplicate creatures and apply basic operations to inhibit, augment, or reverse behaviors. In create mode, illustrated in FIG. 10 and performed with the layouts of FIGS. 6B and 6C, the user working area provides a three-part display for assembling the head 520, belly 522 and base 524 of the creature. Each section can display several instances of the associated body part. The child clicks until the desired part is visible. In draw mode performed with the layout of FIG.

6A, the child adds colorful masks and costumes. Personalized creatures are saved to the child's area of the library. In stage mode, also performed with the layout of FIG. 6A, creatures dragged from the library become dancers who interact with each other as diads, triads, and groups. In shuffle mode, performed with the layout of FIG. 6D, the system cycles through a series of transformations to modify the behaviors of individual creatures and thus, the overall "dance". In enact mode, also performed with the layout of FIG. 6D, the system applies transformative operations to each component of an individual creature, again affecting the overall dance.

The system preferably includes a user interface 600, illustrated in FIG. 12, which is advantageous for operation of the invention. The user interface can be used with either the special computer embodiment of FIG. 2A or the general purpose computer embodiment of FIG. 2B. The user interface includes user working area 610 and a system working area 612, which are variable in size as described above. Two sets 620 and 622 of selectable elements are also displayed in an element library. The first set 620 is predefined or generated by the system. The user may select one of these, or combine them. As noted previously, in the special computer embodiment, the first set of elements may be displayed and selected from an external device, rather than or in addition to being displayed in the user interface. The second set 622 are elements generated by the user and saved in the library. For example, in the geometric embodiment, the user may draw new patterns. Also, patterns selected from a repeating pattern using the frame box can be saved in the second set 622 of elements for future exploration. A group of mode buttons 630 is used to select operations on the basic elements or system actions, as described above. Function buttons 632 may be provided for specific manipulations of the elements by the user. The user interface allows the user to control the relative sizes of the displays for basic elements and interactive patterns. Alternatively, the system may automatically adjust the relative size to best accommodate changes caused by actions.

Figure 13:
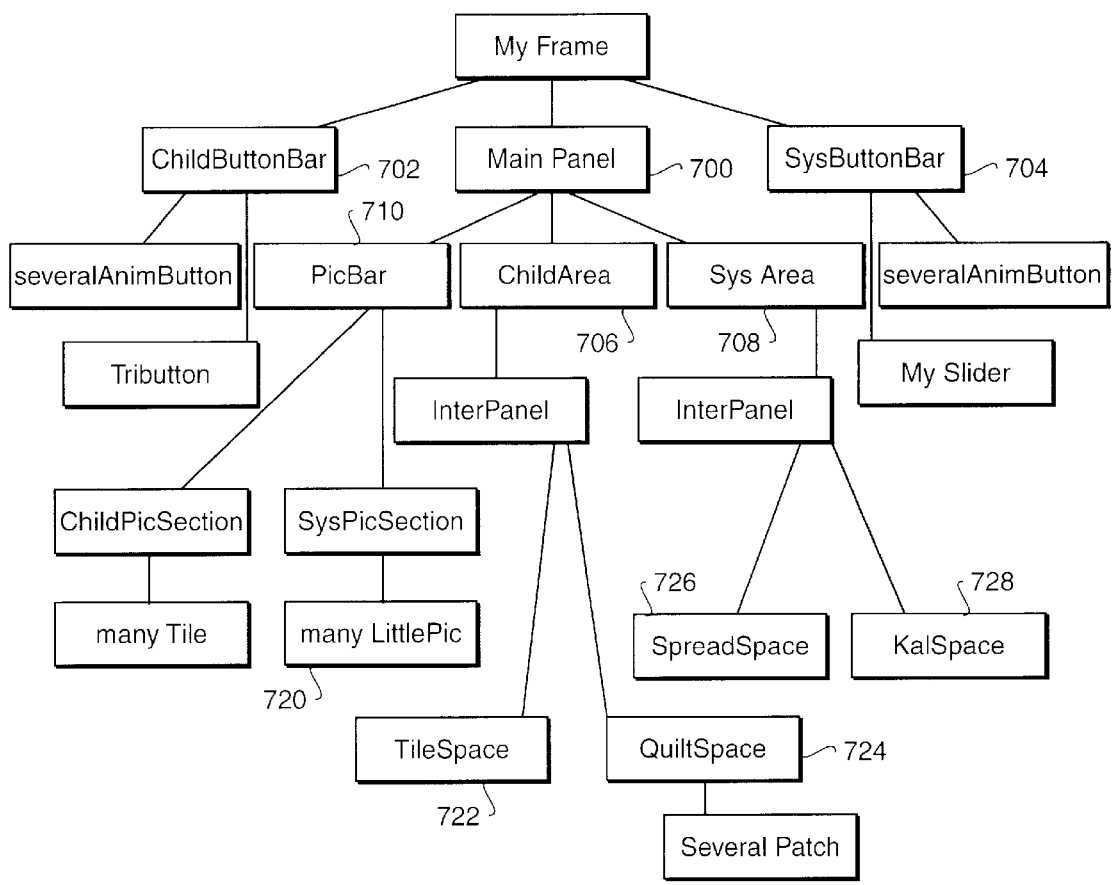
FIG. 13 shows a generalizable object hierarchy for implementing embodiments of the invention as a nested hierarchy of classes and subclasses.

The interface can be implemented as a set of nested objects and subclasses, as shown in FIG. 13. One embodiment of the interface of the invention has been implemented using Java to incorporate elements of its API interface, such as "Panel" and "Canvas" classes. Panel subclasses include MainPanel 700, ChildButtonBar 702, SysButtonBar 704, ChildArea 706, SysArea 708, PicBar 710 and Tile. Canvas subclasses include LittlePic 720, TileSpace 722, QuiltSpace 724, SpreadSpace 726, KalSpace 728. Drop, Flip, Turn, highlight (invert) and graying out extend Java's Image Filter class. Each element includes information about displays, screen locations, and actions to be executed with selection of locations. If an element does not include an instruction for a particular location, an event message is passed to a higher class in the hierarchy for action.

Having described several embodiments, the present invention is not limited to any specific disclosed embodiments. Those of ordinary skill in the art will readily recognize different modifications and variations which are part of this invention. Overall, the concept is the use of an computer-based system for interactive learning about patterns which are the emergent effects from interrelated dynamics of multivariate systems. This process of element creation and selection, replication, and modification can be instantiated in various environments.

What is claimed is:

1. An educational method for constructive-dialogic learning with a computational system, wherein said computational system executes the steps of:

providing a library of tiles having decorative patterns;

providing a user mode having user functions for application to said tiles;

providing a system mode having system functions for application to said tiles;

in response to user selection of one of said tiles and said user mode, applying a user function to the selected tile under user control;

in response to user selection of one of said tiles and said system mode, applying a system function to the selected tile under system control; and wherein the user constructs a patterned object from said tiles utilizing said user functions and said system functions by user-controlled, constructive, dialogic interaction with said system.

2. An educational method as defined in claim 1 wherein said computational system includes a display screen and executes the steps of presenting the user mode in a user working area of said display screen and presenting the system mode in a system working area of said display screen.

3. An educational method as defined in claim 2 further including the step of varying the relative sizes of said user working area and said system working area in accordance with the function being performed.

4. An educational method as defined in claim 3 wherein the step of varying the relative sizes includes increasing the size of said user working area in said user mode and increasing the size of said system working area in said system mode.

5. An educational method as defined in claim 1 wherein the step of providing a user mode includes providing a function for creating a new tile and adding said new tile to said library of tiles.

6. An educational method as defined in claim 1 wherein the step of providing a user mode includes providing a function for combining tiles to form a new tile.

7. An educational method as defined in claim 1 wherein the step of providing a system mode includes providing a function for replicating said tiles to form a decorative pattern.

8. An educational method as defined in claim 1 wherein the step of providing a system mode includes providing a function for offering suggestions to the user for creating a new tile.

* * * * *